(No Model.)
F. O. FRANKE.
METALLIC STUFFING BOX PACKING.
No. 395,968. Patented Jan. 8, 1889.
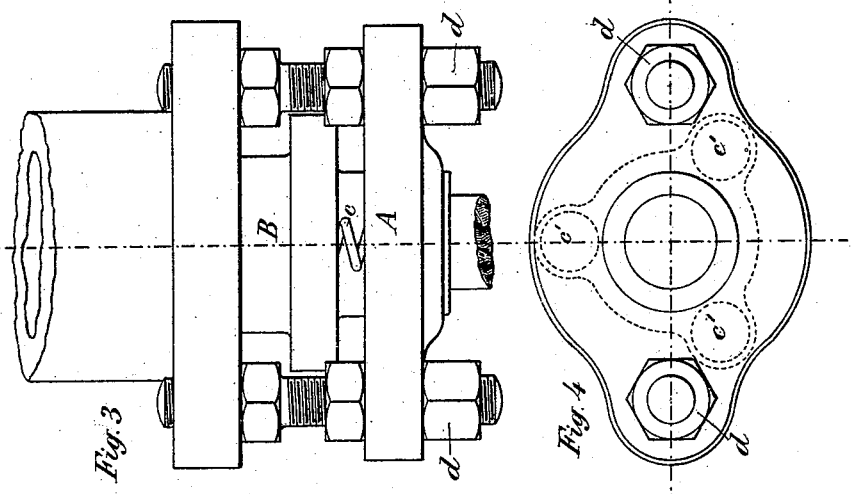
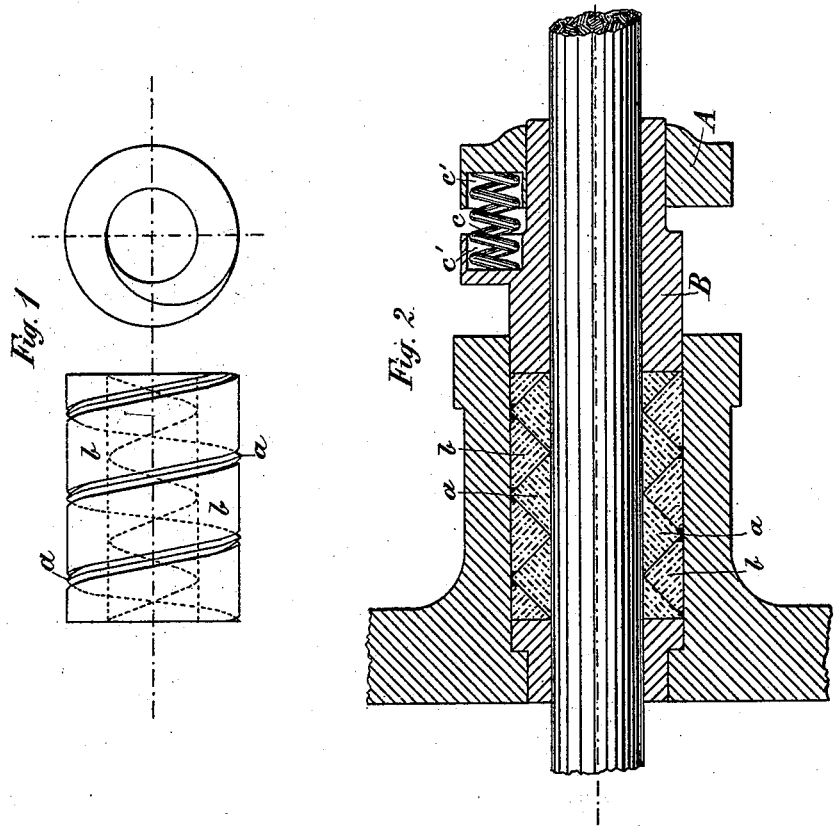
Witnesses:
Inventor
Friedrich Oswald Franke
By Paine & Ladd,
Atty's.

UNITED STATES PATENT OFFICE.

FRIEDRICH OSWALD FRANKE, OF ST. GALL, SWITZERLAND.

METALLIC STUFFING-BOX PACKING.

SPECIFICATION forming part of Letters Patent No. 395,968, dated January 8, 1889.

Application filed March 19, 1888. Serial No. 267,639. (No model.) Patented in England February 18, 1888, No. 2,456.

*To all whom it may concern:*

Be it known that I, FRIEDRICH OSWALD FRANKE, a citizen of Saxony, Germany, residing at St. Gall, in the canton of St. Gall, Switzerland, have invented certain new and useful Improvements in Metallic Stuffing-Boxes, (patented in England, No. 2,456, on the 18th of February, 1888;) and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of my invention is to provide engines of all descriptions with a stuffing-box which is absolutely tight without getting hot, which produces the minimum of friction to the piston-rod, and which, when wearing off, tightens itself automatically.

Figure 1 is a side and an end view of the packing removed from the stuffing-box. Fig. 2 is a longitudinal section through the stuffing-box. Fig. 3 is a side view of the stuffing-box, and Fig. 4 is an end view of the same.

As shown in the annexed drawings, I for this purpose combine two spiral-shaped bodies of triangular section, $a$ and $b$, Fig. 1, which fit one into the other, like a screw in a nut. The inside part, $a$, forming the screw, is pressed against the rod, the outside part, $b$, or the nut, against the inside of the stuffing-box. The tightening on both sides is produced by a pressure exerted on the packing in the direction of the rod. The gland of the stuffing-box is composed of two separated pieces. One forms the flange or collar A, the other the box B, Figs. 2 and 3. They are separated and kept apart by a number (three) of spiral springs, $c$, which are maintained in cylindrical cavities $c'$ of the flange and box placed opposite each other. The box B is provided with a projecting portion of smaller diameter than the box for the said flange A to slide over.

In tightening the flange A with the nuts $d$ the springs $c$ alone exert a pressure on the box B, and consequently on the packing. During the wearing out of the packing the tightness is maintained automatically by the springs $c$, their pressure operating continually in the direction of the rod, so that no retightening is necessary by means of the nuts.

When the packing cannot be passed over the rod, or when a new packing is necessary and the parts are not to be dismounted, the packing can be made in two or more parts separated by longitudinal cuts.

What I claim as my invention is—

The combination, with the metallic packing formed triangular in cross-section, substantially as described, of the box B, bearing against said packing and provided with the cavities $c'$ and the projecting portion on its front end, the flange, also provided with cavities $c'$ and sliding upon the said projection, the springs in the cavities between the flange and the box, and the nuts $d$ for tightening up the said flange and increasing the pressure of the springs upon the metallic packing, substantially as set forth.

In testimony whereof I affix my signature in presence of two witnesses.

FRIEDRICH OSWALD FRANKE.

Witnesses:
ALVIS EINBRITZ,
JOHANN BABTISTE EBNETER.